(12) United States Patent
Haberkorn

(10) Patent No.: US 9,681,303 B2
(45) Date of Patent: Jun. 13, 2017

(54) METHOD FOR FRAUD RECOGNITION IN THE CASE OF ROAMING CONNECTIONS IN MOBILE COMMUNICATIONS NETWORKS

(75) Inventor: Günter Haberkorn, Birgland/Schwend (DE)

(73) Assignee: DEUTSCHE TELEKOM AG, Bonn (DE)

( * ) Notice: Subject to any disclaimer, the term of this patent is extended or adjusted under 35 U.S.C. 154(b) by 1223 days.

(21) Appl. No.: 12/520,830

(22) PCT Filed: Dec. 18, 2007

(86) PCT No.: PCT/EP2007/011091
§ 371 (c)(1),
(2), (4) Date: Oct. 8, 2009

(87) PCT Pub. No.: WO2008/077528
PCT Pub. Date: Jul. 3, 2008

(65) Prior Publication Data
US 2010/0048171 A1   Feb. 25, 2010

(30) Foreign Application Priority Data
Dec. 22, 2006   (DE) .................. 10 2006 062 210

(51) Int. Cl.
*H04W 12/12* (2009.01)
(52) U.S. Cl.
CPC .................. *H04W 12/12* (2013.01)
(58) Field of Classification Search
CPC ...... H04M 3/38; H04M 3/2281; H04M 15/00; H04M 15/80; H04M 15/58; H04M 15/38; H04W 12/12; H04W 12/06; H04W 84/042; H04W 48/00; H04W 92/02; H04W 8/04; H04W 4/24; H04L 63/08; H04L 65/1096
USPC .................. 455/404.2, 408, 410, 411, 456.1; 379/114.14, 127.02, 144.03, 145, 189
See application file for complete search history.

(56) References Cited

U.S. PATENT DOCUMENTS

| 5,953,653 | A | 9/1999 | Josenhans |
| 6,389,283 | B1 * | 5/2002 | Sanchez Herrero .......... 455/433 |
| 2005/0084083 | A1 | 4/2005 | Lawyer et al. |
| 2005/0243754 | A1 * | 11/2005 | Saeed et al. .................. 370/328 |

(Continued)

FOREIGN PATENT DOCUMENTS

DE   19905884 A1   8/2000

OTHER PUBLICATIONS

P. Burge et al., Fraud Detection and Management in Mobile Telecommunications Networks, European Conference on Security and Detection, Apr. 1997, pp. 91-96.

(Continued)

*Primary Examiner* — George Eng
*Assistant Examiner* — Jing Gao
(74) *Attorney, Agent, or Firm* — Browdy and Neimark, PLLC

(57) ABSTRACT

The invention relates to a method for fraud recognition in mobile communication networks, in particular, for fraud recognition in the case of roaming connections, wherein a roaming connection provided for a user identity module, a SIM, is checked for possible misuse by means of at least one criterion. According to the invention, the "engaged rate" for the relevant user identity model is checked as an essential criterion for a given period.

9 Claims, 1 Drawing Sheet

(56) References Cited

U.S. PATENT DOCUMENTS

2007/0072587 A1* 3/2007 Della-Torre ................. 455/410
2007/0167167 A1* 7/2007 Jiang ............................. 455/453
2009/0061860 A1* 3/2009 Jiang ............................. 455/433

OTHER PUBLICATIONS

Jim Black, Real-Time Fraud Management Using SS7, B/OSS Billing & OSS World, Online, http://www.billingworld.com/, Aug. 1999.

* cited by examiner

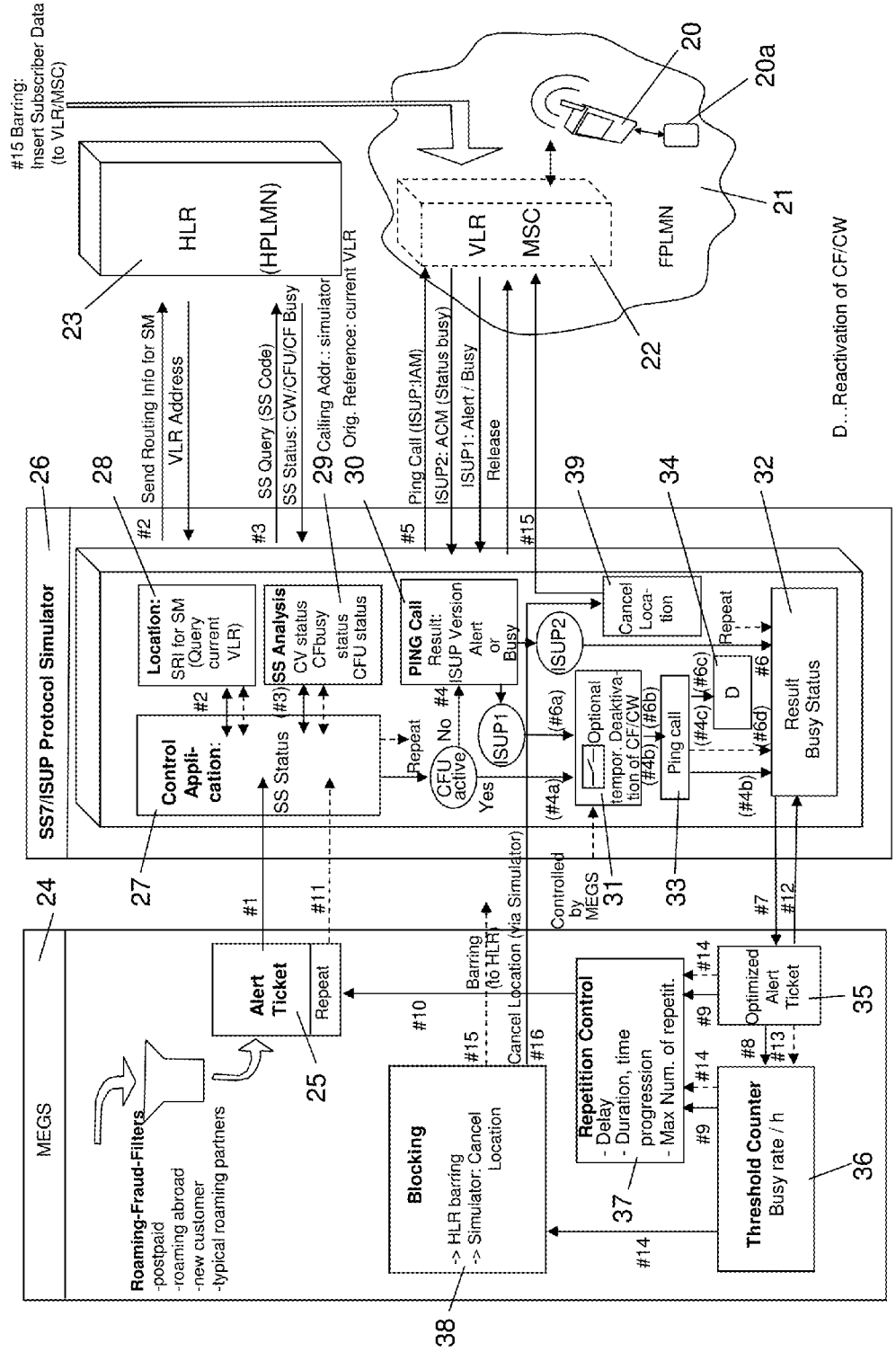

METHOD FOR FRAUD RECOGNITION IN THE CASE OF ROAMING CONNECTIONS IN MOBILE COMMUNICATIONS NETWORKS

FIELD

The present invention relates to a method for fraud detection in mobile communication networks, and in particular to a method for fraud detection in the case of roaming connections, also referred to as so-called roaming fraud.

BACKGROUND

Roaming fraud is causing losses in the millions for the operators of mobile networks, and also for the providers.

In the case of roaming fraud, subscriber identity modules, so-called SIM cards (SIM: Subscriber Identity Module) are being acquired under fake identities or through blackmail. These SIM cards are then used abroad, that is in foreign mobile networks (roaming networks: FPLMN), to set up permanent connections to international destinations (in maximum tariff zones), such as, e.g. the South Sea Islands. As a rule, these are permanent connections (at times also multiple connections via multi-party), that are established during times outside of regular working hours (e.g. on weekends). Particularly on weekends, delays occur in the home network (HPLMN) in recognizing these activities early-on and initiating counter-measures. So-called "high usage reports" that reveal a massive use of roaming connections can sometimes be transmitted from the roaming network to the home network only a few days later. Just three SIM cards, for example, can result in a loss of several thousand Euro to a network operator on a single weekend through the above-mentioned connection scenarios.

T-Mobile Germany has a misuse detection system (Missbrauchserkennungssystem, MEGS) that comprises various filters for early detection of roaming fraud. This involves the use, for example, of typical filter criteria, such as:

SIM card is used for the first time and registers abroad
the card is a postpaid card
typical roaming partners are used (network scoring)
the customer is not a business customer
other filter criteria The MEGS is depicted schematically, at the top left, in FIG. 1. If the above criteria are found to be met in a SIM card an alert ticket is issued. Unfortunately, the success rate with this detection method is currently only a few percent, i.e. of 100 alert tickets only a few actually denote cases of roaming fraud. Since the MEGS filter criteria in most cases apply not only to fraudsters but also to many "normal" customers, a significant flood of alerts (>100/day) can occur with the MEGS. In order to protect the "normal" customers, sanctions can be applied only in those few cases where the suspicions are confirmed. The massive losses that are caused by roaming fraud, therefore, essentially continue.

US 2005 0084083 A1 discloses a method for fraud detection in a communications network, wherein call connections are checked by means of a misuse detection system based on fixed rules for potential misuse. One possible criteria in this context is the duration of the call connections, which are not allowed to exceed a certain threshold value. For connections in the fixed network this is relatively easy to implement. No mention is made of a solution for mobile radio connections, in particular roaming connections.

SUMMARY

The present invention, therefore, has as its object to provide a method for fraud detection in the case of roaming connections in mobile communication networks that has a significantly higher positive detection rate as compared to the method (MEGS) that has been used up to now.

This object is met according to the invention with the characteristics of the independent claim.

Preferred embodiments and additional advantageous characteristics of the invention are specified in the dependent claims.

It was realized that, in the case of outgoing connections abroad, up to now, no signaling connection takes place to the home network operator. This makes it difficult to detect in the home network (HPLMN), which of the customers abroad that were identified by MEGS are maintaining a permanent connection over several hours.

According to the invention, the "busy rate" of the SIM cards in question is, therefore, analyzed as an distinct additional criterion in conjunction with the filters already implemented by MEGS. This means that an additional determination is made in the case of the suspicious SIM cards identified by MEGS, as to whether a permanent connection exists for an extended duration (e.g. several hours). If this is the case, a distinct and timely counter-measure can be initiated. By quickly barring the respective SIM card the total damage can thus be reduced considerably (in most cases by up to 95%). Other customers identified by the existing MEGS detection methods remain untouched by these measures.

By using a test call (without displaying a caller telephone number), in the following called PING call, to the SIM cards/alerts that were pre-filtered via MEGS, the "busy rate" of the individual SIM cards can be determined for a specified duration. After exceeding of a threshold value for the busy rate, a distinct signal can thereby be derived for further sanctions, such as a barring in the HLR (HLR Barring) or disconnection of the call (Cancel Location).

These Ping calls and the subsequent additional scenarios may be carried out using a SS7/ISUP protocol simulator. The SS7, Signaling System #7, comprises a number of protocols and methods for signaling in telecommunications networks, such as the public telephone network, regardless of whether it is an ISDN, fixed network, or mobile network.

The functions that are available to a user are described in so-called User Parts. These functions may depend on the service that is being used (ISDN, analog telephone, mobile radio) and will therefore be described separately. The User Parts that are relevant here are as follows:

The ISUP (ISDN User Part) describes the functions that are available to ISDN users. These include, as the most important element, the description of the service or bearer capability. ISDN enables different user terminals, such as telephone, fax, or computer, to be operated on the same line. In the case of a connection in the ISDN network a description of the service type is always transmitted as well, so that only the user terminal answers that supports the desired service.

The SCCP (Signaling Connection Control Part) is an intermediate layer that provides additional functions beyond MTP Level 3, such as, e.g., connectionless or connection-oriented communication between special network functions. The most important application that builds on SCCP is "Intelligent Network", or IN. IN functions are defined in special recommendations. In some cases ISUP (ISDN USer Part) can also be implemented via SCCP instead of via MTP3.

The MAP (Mobile Application Part) allows for the implementation of the specific functions of mobile networks. Of particular importance, of course, is roaming. Through roaming, a subscriber can switch from one radio cell to the next without loss of connection, and register with foreign networks.

When using PING calls, the following must be factored in:
1) Determination of the Current VLR Location
Relevant SS7 message: Send_RoutingInfo_for_SM (SRI for Short Message)
Result: Application as Orig-Reference in MAP Part of SS7 protocol.
Queries with operation: Interrogate_SS would result in a Cancel_Location (and disconnection of the call) of the respective customer, which is not desirable in this situation.
2) Query SS Status Call Waiting, Call Forwarding Unconditional and Call Forwarding BUSY:
Relevant SS7 message: Interrogate_SS (SS code)
Result: SS status of the respective customer.

Here, the address of the SS7 simulator must be used in the SCCP Part and the current VLR address of the customer in the MAP Part (Orig_Reference). Otherwise, a Cancel_Location will by effected by the HLR.
3) Carrying Out the PING Call
Relevant ISUP message: IAM
Result: If the message is transmitted in the ISUP2 protocol (version 2), the status of the customer (idle or busy) can already be analyzed via the ACM message (Address Complete Message), regardless of Call Forwarding or Call Waiting. Only in the case of an active CFU is a status analysis of the outbound roamer not possible in this case (see options). Currently approximately 90% of the roaming connections within Europe are connected via ISUP2 protocol.

In the case of an ISUP1 connection, only the ALERT or BUSY status can be analyzed. However, the SS status from the analysis of Point 2 needs to be factored in as well. In the case of an active CFbusy or CW, the result of the Ping call cannot be factored in (see options).
4) Temporary Deactivation of Call Forwarding and Call Waiting
Relevant ISUP message: Deactivate_SS, Activate_SS (with corresponding SS code)
Result: Optionally, the SS service can be temporarily deactivated in the HLR in the case of an active CFU or active CFbusy/CW in combination with ISUP1. The subsequent PING call accordingly provides a distinct result for the "busy status" of the customer. The SS7 message "Activate_SS" restores the original SS status (including destination telephone number) after completion of the PING call. Note: total duration between temporary deactivation and reactivation: amounts to preferably less than 20 seconds.

The results of the PING calls lead to a quality increase in the detection of actual fraudsters among the original alerts by more than 90%. Repetitions of the check loop (CF/CW status; PING call, or optionally: CF/CW deactivation; PING CALL; CF/CW reactivation) result in an accumulation of indications and refine the validity of this alert.

Upon exceeding of the threshold value for the busy rate, MEGS triggers a barring in the HLR. Calls in progress, however, additionally need to be disconnected via the SS7 message "Cancel Location" (permanent connection by the fraudster). This can be effected via the SS7 protocol simulator as well.

BRIEF DESCRIPTION OF THE DRAWINGS

An exemplary embodiment of the invention will be described in greater detail below with the aid of the drawing of FIG. 1.

DETAILED DESCRIPTION

A roaming subscriber, using a personal subscriber identity module, SIM card 20a, is located with his mobile user terminal 20 in the service area of a foreign roaming mobile network FPLMN. A standard check is performed, as to whether the risk of roaming fraud exists.

In accordance with the invention, the MEGS 24 continues to be used for the preliminary analysis of potential roaming frauds. The MEGS 24 has multiple roaming fraud filters that are applied to the SIM cards during roaming connections. If the filter criteria are found to be met in connection with the SIM card 20a of the mobile user terminal 20, an alert ticket 25 is issued by the MEGS 24.

In accordance with step #1, the alert ticket 25 that was generated by the MEGS 24 is routed with the variable mobile telephone number (MSISDN) and mobile subscriber identification (IMSI) of the associated SIM card 20a to a protocol simulator 26 for alert optimization. There, the alert ticket is initially processed by a control application 27 to determine the SS status.

In a step #2, a current location query (VLR address), i.e. a determination of the Visitor Location Register VLR 22 providing service to the SIM card 20a is performed via a Location Module 28 of the protocol simulator 26 by means of the MAP command Send Routing Info for Short Message (SRIfSM).

In a step #3, a status check of the supplementary services selected for the SIM card 20a is performed by means of an SS analysis module 29 at the respective Home Location Register HLR 23. The SS status check can have the following results: call waiting (Call Waiting), call forwarding if busy (Call Forwarding Busy: CFBusy) and unconditional call forwarding (Call Forwarding Unconditional: CFU).

According to a step #4, the SS check results are routed to different modules of the protocol simulator 26. If, for example, CFU is not activated, further handling is transferred to the module 30 for carrying out a Ping call.

In a step #5, a PING CALL is now carried out. If the ISUP1 protocol (version 1) is used, "Alert" or "Busy" are analyzed factoring in the previously determined SS status. As a rule, active call forwarding to the subscribers voicemail box will have been activated. In this case the result is forwarded to the module "Optional Temporary Deactivation of SS" 31.

If the ISUP2 protocol (version 2) is used, an analysis takes place via the Address Complete Message, ACM (busy status). Triggering of the connection takes place immediately after receipt of the relevant return result message, so as to prevent a ringing or billable calls.

In a step #6, the result is routed to the module "Result" 32. This is followed by step #7 or, under certain circumstances, by steps 4a or 6a, respectively.
Optional Intermediate Steps or Alternatives (Steps #4a Through #6d)

PING calls with ISUP1 and active Call Forwarding$_{[s1]}$ Busy (CFbusy) or Call Waiting (CW), as well as SS queries that reveal an active Call Forwarding Unconditional (CFU) result in a routing to the module "Optional Temporary Deactivation of SS" 31. The activation/deactivation of this module is performed by MEGS 24.

In steps #4a and #6a, respectively, subsequent handling takes place in the module "Optional Temporary Deactivation of SS" 31: the action that is performed here includes the deactivation of all identified active CF/CW (results of the module "SS Analysis"). SS7 message: deactivate_SS (SS code).

Here, the address of the SS7 simulator must be used in the SCCP Part, and the current VLR address of the subscriber in the MAP Part (Orig_Reference). Otherwise a Cancel_Location will be effected by the HLR 23, resulting in the disconnection of the call.

Updating of the VLR 22 takes place via the message "insert subscriber data". This message is sent automatically from the HLR 23 to the VLR 22.

In steps #4b and #6b, respectively, the PING call 33 is carried out. The analysis of the PING call results takes place as described in step #5.

In steps #4c and #6c, respectively, a reactivation 34 of the previously deactivated SS services takes place with the SS message: activate_SS (SS code). Any previously active forwarding is thereby automatically given the same destination telephone number (e.g. voicemail box) as previously set up.

Here, the address of the SS7 simulator must be used in the SCCP Part, and the current VLR address of the subscriber in the MAP Part (Orig_Reference). Otherwise a Cancel_Location will be effected by the HLR 23, resulting in the disconnection of the call.

Updating of the VLR 22 takes place via the message "insert subscriber data". This message is sent automatically from the HLR 23 to the VLR 22.

In steps #4d and #6d, respectively, the result is routed to the module "Result" 32. The result includes the busy status of the mobile radio terminal 20 that is being operated with the SIM card 20a for a specified duration, for example "Busy for at least 60 minutes".

In step #7, the results of the analysis are transferred with the indicators "Busy Status", MSISDN, IMSI, VLR ID, ISUP Version, CF Status and CW Status from the Results module 32 in the form of an optimized alert ticket 35 to MEGS 24.

In step #8, MEGS 24 analyzes the result of each SIM card in a threshold counter 36 via the "busy rate". This can be used to specify, starting at which number of repetitions or which "busy rate" a barring of the respective SIM card 20a may be initiated.

In step #9, an additional PING CALL is initiated, according to the same scenario as described in steps #2 through #6, if the required number of repetitions has not been reached. A repetition control unit 37 checks the required delay between the PING CALLS and assumes further control of the repetition function (see FIG. 1).

In Step #10 an additional PING CALL is triggered via the input interface (control application 27) between MEGS 24 and protocol simulator 26.

Steps #11 and #12 describe the repetition of steps #1-#7 (repetition function) as described above.

According to step #13, if the specified number of repetitions has been reached, no additional PING CALL is initiated. The check module Threshold Counter 36 analyzes whether the "busy rate" of the respective SIM card has exceeded the specified threshold value (e.g. 60 minutes).

According to step #14, if the threshold value for the respective SIM card 20a has been exceeded, a signal for initiation of the barring is sent to the module "Blocking" 38.

According to step #15, the module "Blocking" 38 triggers the barring of the SIM card in the HLR 23 as well as a signal to the protocol simulator 26 for sending of the message "Cancel Location". This is done using the VLR Global Title that was identified by the check module "Location" 28 (SRIfSM).

According to step #16, the protocol simulator 26 sends the message "Cancel Location" via the module Cancel Location 39 to the current VLR 22. This causes a call in progress to be disconnected and the respective SIM card 20a must re-register with the VLR 22. In the case of additional activities of the SIM card, the newly activated SIM barring takes effect in the HLR 23 via MEGS 24. The appropriate parameters for barring the SIM are transmitted automatically from the HLR 23 to the VLR 22 via the message "insert subscriber data".

A data processing program stored on a computer readable medium having a program code that, when executed on one or multiple data processing devices, performs a method according to the present invention. A data processing program product stored on a computer readable medium comprising a program code that is executable on one or multiple data processing devices for performing the method according to the present invention.

Optimizing the fraud detection according to the proposed concept makes it possible to significantly reduce the losses that are caused by so-called roaming fraud.

LIST OF REFERENCE NUMERALS

1 through #16 process steps
20 mobile radio terminal
20a SIM card
21 roaming mobile network (FPLMN)
22 Visitor Location Register VLR (of the FPLMN)
23 Home Location Register HLR (of the HPLMN)
24 MEGS (misuse detection system)
25 alert ticket
26 protocol simulator
27 control application (SS status)
28 module "Location"
29 module "SS Analysis"
30 module "PING Call"
31 module "CF/CW Deactivation"
32 module "Result"
33 module "PING Call"
34 module "CF/CW reactivation"
35 optimized alert ticket
36 module "Threshold Counter"
37 module "Repetition Control"
38 module "Blocking"
39 module "Cancel Location"

What is claimed is:

1. A method for fraud detection in mobile communication networks, in case of roaming connections, wherein an existing misuse detection system (MEGS) is used for a preliminary analysis of potential roaming frauds and, in a case of a suspicious subscriber identity module, identified by the MEGS, a roaming connection provided for the suspicious subscriber identity module is checked by at least one additional criterion for possible misuse, the method comprising:
  placing at least one test call to the suspicious subscriber identity module to check a busy rate of the suspicious subscriber identity module to determine if the suspicious subscriber identity module is busy for a specified duration as the criterion, wherein,
  prior to carrying out the test call, determining a current location of the suspicious subscriber identity module by querying a current Visitor Location Register (VLR) location of the suspicious subscriber identity module,
  prior to carrying out the test call, determining a current Supplementary Services (SS) status of the suspicious subscriber identity module, comprising Call Waiting, Call Forwarding Unconditional, and Call Forwarding BUSY, at a Home Location Register (HLR), in the case of the current SS status being an active Call Forwarding Unconditional or active Call Forwarding BUSY or active Call Waiting in combination with Integrated Services Digital Network User Part 1 (ISUP1), temporarily deactivating the SS service in the HLR, carrying out the test call after the temporary deactivation, and after completion of the test call, restoring an original SS status, repeating the step of placing the test call a number of times, analyzing whether the busy rate of the suspicious subscriber identity module exceeds a threshold value, and if the busy rate of the suspicious subscriber identity module exceeds the threshold value in the step of analyzing, sending a signal to initiate barring of the suspicious subscriber identity module in the HLR.

2. The method according to claim 1, further comprising, in a case in which the busy rate exceeds a specified time threshold, initiating measures for misuse prevention with respect to the suspicious subscriber identity module.

3. The method according to claim 2, wherein the measures for misuse prevention comprise barring an outgoing call in the HLR or disconnection of a current outgoing call.

4. The method according to claim 1, wherein the step of carrying out the test call comprises using a Signaling System #7/Integrated Services Digital Network protocol simulator (26).

5. The method according to claim 1, further comprising after carrying out the test call, in a case of an active Call Forwarding or Call Waiting in combination with an Integrated Services Digital Network User Part 2 (ISUP2) connection, analyzing a status of the suspicious subscriber identity module via an Address Complete Message, wherein a status analysis of an outbound roamer is not possible in the case of an active Call Forwarding Unconditional.

6. The method according to claim 1, further comprising after carrying out the test call, in the case of an ISUP1 connection, analyzing an ALERT or BUSY status, wherein a test call result cannot be factored in, in the case of an active Call Forwarding Busy or Call Waiting.

7. A data processing program stored on a computer readable non-transitory storage medium having a program code that, when executed on one or multiple data processing devices, performs a method according to claim 1.

8. A data processing program product stored on a computer readable non-transitory storage medium comprising a program code that is executable on one or multiple data processing devices for performing the method according to claim 1.

9. A system for performing a method for fraud detection in mobile communication networks in case of roaming connections, comprising a misuse detection system (MEGS) for a preliminary analysis of potential roaming frauds and, in a case of a suspicious subscriber identity module, identified by the MEGS, a roaming connection provided for the suspicious subscriber identity module is checked by means of at least one additional criterion for possible misuse, and a protocol simulator, wherein the system is configured to carry out following steps:

placing at least one test call to the suspicious subscriber identity module to check a busy rate of said suspicious subscriber identity module to determine if said suspicious subscriber identity module is busy for a specified duration as the at least one additional criterion, prior to carrying out the test call, determining a current location of the suspicious subscriber identity module by querying a current Visitor Location Register (VLR) location for the current location of the suspicious subscriber identity module, prior to carrying out the test call, determining a current Supplementary Services (SS) status of the suspicious subscriber identity module, comprising Call Waiting, Call Forwarding Unconditional, and Call Forwarding BUSY, at a Home Location Register (HLR), in the case of the current SS status being an active Call Forwarding Unconditional or active Call Forwarding BUSY or active Call Waiting in combination with Integrated Services Digital Network User Part 1 (ISUP1), temporarily deactivating the SS service in the HLR, carrying out the test call after the temporary deactivation, and after completion of the test call, restoring an original SS status, repeating the step of placing the test call a number of times, analyzing whether the busy rate of the suspicious subscriber identity module exceeds a threshold value, and if the busy rate of the suspicious subscriber identity module exceeds the threshold value in the step of analyzing, sending a signal to initiate barring of the suspicious subscriber identity module in the HLR.

\* \* \* \* \*